Patented Jan. 3, 1928.

1,654,778

UNITED STATES PATENT OFFICE.

RAYMOND C. BENNER, OF BAYSIDE, AND JOHN H. FINK, OF BROOKLYN, NEW YORK, ASSIGNORS, BY MESNE ASSIGNMENTS, TO PREST-O-LITE STORAGE BATTERY CORPORATION, A CORPORATION OF INDIANA.

PREFORMED POSITIVE ELECTRODE AND PROCESS OF MAKING THE SAME.

No Drawing. Application filed July 10, 1923. Serial No. 650,728.

This invention relates to the manufacture of active materials and electrodes for lead-sulfuric acid storage cells. A particular object of the invention is to provide improved positive electrodes capable of use in generating current without the customary "forming".

In the production of Planté plates, and to a less extent of pasted electrodes of the Faure or Brush type, a long forming process is necessary. This may consume from a few days to more than a month, depending upon the type of electrode. The forming process adds materially to the cost of production. It would therefore be desirable to use electrodes ready for immediate service, or "preformed" electrodes, if comparable in performance to those receiving preliminary charge. This has not usually been the case with such electrodes made by prior processes.

According to this invention, preformed positive electrodes of high efficiency are made by suitable treatment of finely divided lead, including controlled electrolytic oxidation of the lead, and special methods for applying it to supports. In an application Serial No. 650,729, filed of even date herewith by R. C. Benner and others, preformed negative plates adapted for assembly with such positives, or for other uses, are described and claimed.

Lead may be prepared for the purposes of this invention by electrodeposition from an acidified calcium acetate or lead acetate solution, using a lead anode. The concentration of electrolyte, current density, and other factors, may be so regulated that lead in the desired physical condition is produced with a minimum consumption of electrical energy, as described in the application mentioned. Filamentous, feathery, or spongy lead, having a somewhat crystalline structure, is to be preferred.

Superficial oxidation of the finely-divided lead is likely to take place after removal from the electrolytic bath. This oxidation is not objectionable, and in fact it is sometimes desirable to facilitate it, as by moistening and stirring the lead to expose fresh surfaces to the air. The electric energy required in the formation of peroxid is reduced when part of the lead has been converted into monoxid, and the process is also expedited. Generally, however, the air oxidation will not be carried beyond about 75 to 80% monoxid, because of the length of time required for the remainder of the lead to react.

After washing the electrodeposited lead substantially free from retained acetate solution, which would be injurious in the battery, it is treated to form the peroxid. This may be done in any suitable way. For example, the lead may be placed on a flat anode immersed in a bath of sulfuric acid of about 1.150 specific gravity, the cathode being placed in the bath near its surface. The lead supported by the anode is progressively converted into peroxid. Various other arrangements of the electrodes and of the material to be oxidized may be adopted, including the application of the lead to the supports which it is ultimately to occupy, as described more fully later.

An important feature of the invention is the regulation of the electrolysis to produce the desired amount of peroxid. We have discovered that improved results, as well as economy in current consumption, result from stopping the oxidation when from about 50 to 90% only of the lead has been converted into peroxid.

The peroxidized product contains lead sulfate and, usually, some lead monoxid and tetroxid and perhaps metallic lead. Any of the latter which may be present reacts with atmospheric oxygen, if the product is dried in moist air, forming the monoxid. A relatively high proportion of lead sulfate is desirable, as it results in a light-weight, porous plate. This effect of lead sulfate is caused by the fact that its specific gravity is about 6.2, as compared with about 9.4 for the peroxid. Hence, when the sulfate is converted into the less bulky peroxid in charging the battery, a porous structure is produced.

A partial conversion into peroxid is sufficient for high capacity. The quantity of current, concentration of electrolyte, and other factors may be easily selected so that the desired amount of peroxidation and sulfation may take place, and the porosity of the electrode may accordingly be regulated to suit particular conditions. The sulfate may be present in amounts of from about 5% to about 45%. A composition desirable for general use contains about 85% $PbO_2$, 10% $PbSO_4$ and 5% PbO and $Pb_3O_4$. If the lead peroxid composition is not to be used at once, it should be washed to remove free sulfuric acid. In the absence of such acid the composition may be kept indefinitely in the air without change.

The mixture of peroxid, sulfate, monoxid, and tetroxid or metallic lead, is mixed with a suitable binder for application to supports. We have discovered that excellent results may be obtained by making the mixture into a paste of proper consistency with sulfuric acid having a specific gravity of from about 1.250 to about 1.350. If more dilute acid is used, the pasted material is usually too soft and tends to fall from the grid or other support, while with stronger acid the capacity of the plate is cut down. Maximum durability and efficiency appear to be obtained when acid within the range of concentration indicated is used. Pasting may be carried out in any suitable way and should be followed by compression. Relatively high pressures are desirable, but if lower pressures are necessary, because of the fragility of the grid or other reasons, good results may nevertheless be obtained. A pressure of about 2000 to 5000 lbs. per sq. in. has been found to be advantageous in compressing the active material into grids having rather large openings.

The pasted electrodes are preferably baked at a temperature of from about 100° to 125° C., for from 2 to 6 hours. The temperature and time of heating may vary somewhat, depending upon the percentage of moisture in the pasted materials, and upon other factors. The active material, even if it has been subjected to pressure, retains considerable sulfuric acid, and this has a beneficial effect during the heating, for as water is driven off the acid becomes concentrated, dissolving any metallic lead or monoxid present, and forming additional sulfate.

The regulation of porosity by controlling the extent of oxidation in the manner described, and other features of the present invention, are applicable to electrodes other than those of the preformed type. For example, it may be expedient to place electrodeposited lead, with or without partial oxidation to monoxid, upon the support which it is to occupy in the cell, and to convert it on the support into a mixture of peroxid with sufficient sulfate to insure the desired porosity. This procedure should generally be followed by baking in a manner similar to that previously described. If the oxidation is carried out in a sulfuric acid bath, the acid retained by the oxidized material may be depended upon to effect the desired formation of sulfate. Or the electrode may be impregnated with additional acid before baking.

In applying the lead to the support, the pressure should not be much in excess of that required to prevent disintegration. Low pressure insures a porous texture which facilitates oxidation and results in a better product. Also, if the lead is too much compacted, the expansion incident to the formation of peroxid will cause the plate to buckle. We have discovered that the pressure may be regulated so as to obtain on the one hand freedom from buckling of the plate during charge and on the other adequate coherence of the oxidized product. It is impractical to give any precise figures as to the amount of pressure required to produce these results, as it will vary with the composition and physical condition of the material to be compacted, the character of the grid, and other factors. With this indication of procedure, however, no difficulty will be found in determining experimentally the proper pressure to be applied in each particular case.

Positive electrodes prepared by the methods described are capable of immediate effective service when assembled with electrolyte and suitable negative plates. The initial capacity of the preformed positives may be slightly lower than that of similar charged electrodes, and it may be desirable in some cases to give the preformed positives a short preliminary charge to bring them up to full capacity. Such charge, if required at all, will be of far shorter duration than the ordinary forming charge of positive plates. The advantages of the preformed type more than offset the possible slight initial deficiency of capacity. The preformed positives in any case come up to normal capacity after their first charge incident to the use of the battery.

The improved electrodes may be prepared at very low cost. Commercial pig lead is sufficiently pure to be used as the raw material, and it may be converted into peroxid, requiring little or no forming, by merely the two electrolytic steps described. This is much simpler and more economical than processes involving the chemical conversion of massive lead into an oxid, followed by peroxidation.

We are aware that it has been proposed to treat the lower lead oxids, or superficially oxidized metallic lead, with sulfuric acid to obtain a predetermined sulfate content. The resulting compositions must be electrically formed, however, and the amount of sulfate in the electrodes produced from them is not regulated as in the present invention. Preformed positive plates, made from a mechanical mixture of litharge and electrolytic peroxid, have also been suggested. In distinction to this, the active material of the present invention is made by chemical and electrochemical reactions upon a single body of lead. As a result of this method of formation, the intermixture of the various constituents is more intimate than is obtainable by mechanical means. The more efficient service given by the electrodes herein described is believed to be due in some measure to this cause. However, the improved intermixture of the constituents is only one of the factors which contribute to the success of the present process. Prior unsuccessful attempts to produce commercial preformed positive electrodes have involved one or more defective procedures, as well as improper mixtures of active material. The present invention resides in the regulation of all the essential conditions to produce electrodes having the desired characteristics.

We claim:

1. Process of making preformed positive electrodes, comprising electrodepositing lead in finely divided condition, electrolytically oxidizing the deposited lead until 50-90% thereof is converted into peroxid, making a paste comprising the oxidized product, and applying the same to a support.

2. Process of making preformed positive electrodes, comprising electrodepositing lead in finely divided condition, electrolytically oxidizing the deposited lead until 50-90% thereof is converted into peroxid, allowing the residual lead to oxidize in the air, making a paste comprising the oxidized product, and applying the same to a support.

3. Process of making preformed positive electrodes, comprising electrodepositing lead in finely divided condition, allowing the lead to partially oxidize to monoxid in an oxidizing atmosphere, electrolytically oxidizing the partially oxidized product until a portion only is converted into peroxid, making a paste comprising the oxidized product, and applying the same to a support.

4. Process of making preformed positive electrodes, comprising electrodepositing lead in finely divided condition, electrolytically oxidizing the deposited lead until a portion only is converted into peroxid, mixing said partially oxidized product with sulfuric acid of specific gravity between about 1.250 and about 1.350 to a pasty consistency, applying the pasty composition to a support, and then baking the composition thereon.

5. Process of making preformed positive electrodes, comprising producing a composition containing 50-90% lead peroxid, mixing said composition with sulfuric acid of specific gravity between about 1.250 and about 1.350 to a pasty consistency, and applying the pasty composition to a support.

6. The invention according to claim 5, in which the composition contains lead sulfate and lead monoxid.

7. The invention according to claim 5, in which the pasted composition is compressed upon the support and then baked.

8. Process of making preformed positive electrodes, comprising producing a composition containing 50-90% lead peroxid, mixing said composition with sulfuric acid of specific gravity between about 1.250 and about 1.350 to a pasty consistency, applying the pasty composition to a support, compressing the composition upon said support, and then baking the composition thereon at about 100°-125° C. for a period of from 2 to 6 hours.

9. Process of making preformed positive electrodes, comprising applying a composition containing 50-90% lead peroxid and sulfuric acid to a suitable support, and baking the composition thereon.

10. Process of making positive electrodes of predetermined porosity, comprising electrodepositing lead in subdivided condition, electrolytically oxidizing the lead, and regulating the oxidation to produce peroxid in admixture with the proper amount of sulfate to insure the desired porosity making a paste comprising the oxidized product and applying the same to a support.

11. Process of making non-buckling positive electrodes, comprising pressing finely divided lead upon an extended support by pressure regulated to produce a permanently coherent mass of sufficient porosity to compensate for expansion on oxidation.

12. Process according to claim 11, in which the lead is partly converted into monoxid before pressing upon the support.

13. A positive electrode for use in a secondary battery consisting of a support having a coating attached thereto, said coating comprising 50-90% lead peroxid, lead sulfate and lead, in intimate admixture such as may be obtained by partial electrolytic oxidation of finely divided lead in sulfuric acid electrolyte.

14. Active material for use in the manufacture of positive electrodes, comprising lead, lead sulphate and from 50 to 90% of lead peroxide in an intimate admixture such as can be obtained by partial electrolytic oxidation of finely divided lead in sulphuric acid electrolyte.

15. Active material for use in the manufacture of positive electrodes, comprising lead peroxide, lead, and from about 5 to 45% of lead sulphate in an intimate admixture such as can be obtained by partial electrolytic oxidation of finely divided lead in sulphuric acid electrolyte.

In testimony whereof, we affix our signatures.

RAYMOND C. BENNER.
JOHN H. FINK.